United States Patent
Inoshita (10) Patent No.: US 11,604,478 B2
(45) Date of Patent: Mar. 14, 2023

(54) INFORMATION PROCESSING APPARATUS, INFORMATION PROCESSING METHOD, AND INFORMATION PROCESSING PROGRAM

(71) Applicant: NEC CORPORATION, Tokyo (JP)

(72) Inventor: Tetsuo Inoshita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 267 days.

(21) Appl. No.: 16/493,923

(22) PCT Filed: Mar. 31, 2017

(86) PCT No.: PCT/JP2017/013774
§ 371 (c)(1),
(2) Date: Sep. 13, 2019

(87) PCT Pub. No.: WO2018/179403
PCT Pub. Date: Oct. 4, 2018

(65) Prior Publication Data
US 2021/0124371 A1    Apr. 29, 2021

(51) Int. Cl.
*G05D 1/04* (2006.01)
*B64C 39/02* (2006.01)
(Continued)

(52) U.S. Cl.
CPC ........... *G05D 1/042* (2013.01); *B64C 39/024* (2013.01); *G05D 1/0038* (2013.01);
(Continued)

(58) Field of Classification Search
CPC .... G05D 1/042; G05D 1/0038; B64C 39/024; B64C 2201/027; B64C 2201/127;
(Continued)

(56) References Cited

U.S. PATENT DOCUMENTS

2005/0267653 A1* 12/2005 Matsushita ................ 701/14
2012/0089274 A1*  4/2012 Lee ................ B64C 39/024
                                                701/2
(Continued)

FOREIGN PATENT DOCUMENTS

CN    103134475 A    6/2013
CN    106502267 A    3/2017
(Continued)

OTHER PUBLICATIONS

Communication dated Jul. 23, 2020 by The State Intellectual Property Office of the P.R. of China in application No. 201780089004.3.

(Continued)

*Primary Examiner* — Elaine Gort
*Assistant Examiner* — Anthony M Gartrelle (57) ABSTRACT

Concerning a partial area image that constitutes a wide area image, to control a flying body in accordance with a flight altitude at a past point of time of image capturing, an information processing apparatus includes a wide area image generator that extracts, from a flying body video obtained when a flying body captures a ground area spreading below while moving, a plurality of video frame images and combines the video frame images, thereby generating a captured image in a wide area, an image capturing altitude acquirer that acquires a flight altitude at a point of time of image capturing by the flying body for each of the plurality of video frame images, and an image capturing altitude output unit that outputs a difference of the flight altitude for each video frame image.

7 Claims, 8 Drawing Sheets

(51) Int. Cl.
*G05D 1/00* (2006.01)
*G08G 5/00* (2006.01)
*H04N 5/232* (2006.01)

(52) U.S. Cl.
CPC ......... *G08G 5/0013* (2013.01); *G08G 5/0039* (2013.01); *G08G 5/0069* (2013.01); *H04N 5/23238* (2013.01); *B64C 2201/027* (2013.01); *B64C 2201/127* (2013.01)

(58) Field of Classification Search
CPC .. G08G 5/0013; G08G 5/0039; G08G 5/0069; H04N 5/23238
See application file for complete search history.

(56) References Cited

U.S. PATENT DOCUMENTS

| | | | | |
|---|---|---|---|---|
| 2012/0095623 | A1* | 4/2012 | Barral | G08G 5/0052 701/4 |
| 2012/0300070 | A1 | 11/2012 | Ohtomo et al. | |
| 2013/0176423 | A1 | 7/2013 | Rischmuller et al. | |
| 2016/0132057 | A1* | 5/2016 | Kim | B64C 39/024 701/2 |
| 2017/0038405 | A1* | 2/2017 | Zhou | G06V 20/13 |
| 2017/0083027 | A1 | 3/2017 | Tao et al. | |
| 2018/0146138 | A1* | 5/2018 | Jeon | G06T 3/4038 |

FOREIGN PATENT DOCUMENTS

| | | | | |
|---|---|---|---|---|
| CN | 106504192 A | | 3/2017 | |
| EP | 2437026 A1 | * | 4/2012 | ............ G01B 11/25 |
| JP | 2012-242321 A | | 12/2012 | |
| JP | 2013-139256 A | | 7/2013 | |
| JP | 2017-046328 A | | 3/2017 | |
| WO | 2015/031281 A1 | | 3/2015 | |
| WO | 2015180133 A1 | | 12/2015 | |

OTHER PUBLICATIONS

Communication dated Feb. 7, 2020, from the European Patent Office in European Application No. 17903432.7.
International Search Report of PCT/JP2017/013774 dated Jun. 27, 2017

* cited by examiner

INFORMATION PROCESSING APPARATUS, INFORMATION PROCESSING METHOD, AND INFORMATION PROCESSING PROGRAM

CROSS REFERENCE TO RELATED APPLICATIONS

This application is a National Stage of International Application No. PCT/JP2017/013774 filed Mar. 31, 2017.

TECHNICAL FIELD

The present invention relates to an information processing apparatus, an information processing method, and an information processing program.

BACKGROUND ART

In the above technical field, patent literature 1 discloses a technique of capturing a wide place using a radio aircraft.

CITATION LIST

Patent Literature

Patent literature 1: Japanese Patent Laid-Open No. 2017-46328

SUMMARY OF THE INVENTION

Technical Problem

However, the technique described in the above literature cannot perform flight control according to an altitude at a past point of time of image capturing.

The present invention enables to provide a technique of solving the above-described problem.

Solution to Problem

One example aspect of the present invention provides an apparatus comprising:

a wide area image generator that extracts, from a flying body video obtained when a flying body captures a ground area spreading below while moving, a plurality of video frame images and combines the video frame images, thereby generating a captured image in a wide area;

an image capturing altitude acquirer that acquires a flight altitude at a point of time of image capturing by the flying body for each of the plurality of video frame images; and an image capturing altitude output unit that outputs a difference of the flight altitude for each video frame image.

Another example aspect of the present invention provides a method comprising:

extracting, from a flying body video obtained when a flying body captures a ground area spreading below while moving, a plurality of video frame images and combining the video frame images, thereby generating a captured image in a wide area;

acquiring a flight altitude at a point of time of image capturing by the flying body for each of the plurality of video frame images; and outputting a difference of the flight altitude for each video frame image.

Still other example aspect of the present invention provides a program for causing a computer to execute a method, comprising:

extracting, from a flying body video obtained when a flying body captures a ground area spreading below while moving, a plurality of video frame images and combining the video frame images, thereby generating a captured image in a wide area;

acquiring a flight altitude at a point of time of image capturing by the flying body for each of the plurality of video frame images; and outputting a difference of the flight altitude for each video frame image.

Advantageous Effects of Invention

According to the present invention, concerning a partial area image that constitutes a wide area image, it is possible to control the flying body in accordance with the flight altitude at the past point of image capturing.

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise. Note that in the following explanation, a "flying body" is a so-called drone, which is an unmanned aircraft (UAV (Unmanned Aerial Vehicle)) capable of flying by remote control or autonomous control.

First Example Embodiment

An information processing apparatus 100 according to the first example embodiment of the present invention will be described with reference to FIG. 1. The information processing apparatus 100 is an apparatus configured to perform flight control according to an altitude at the time of image capturing by a flying body.

Figure 1:
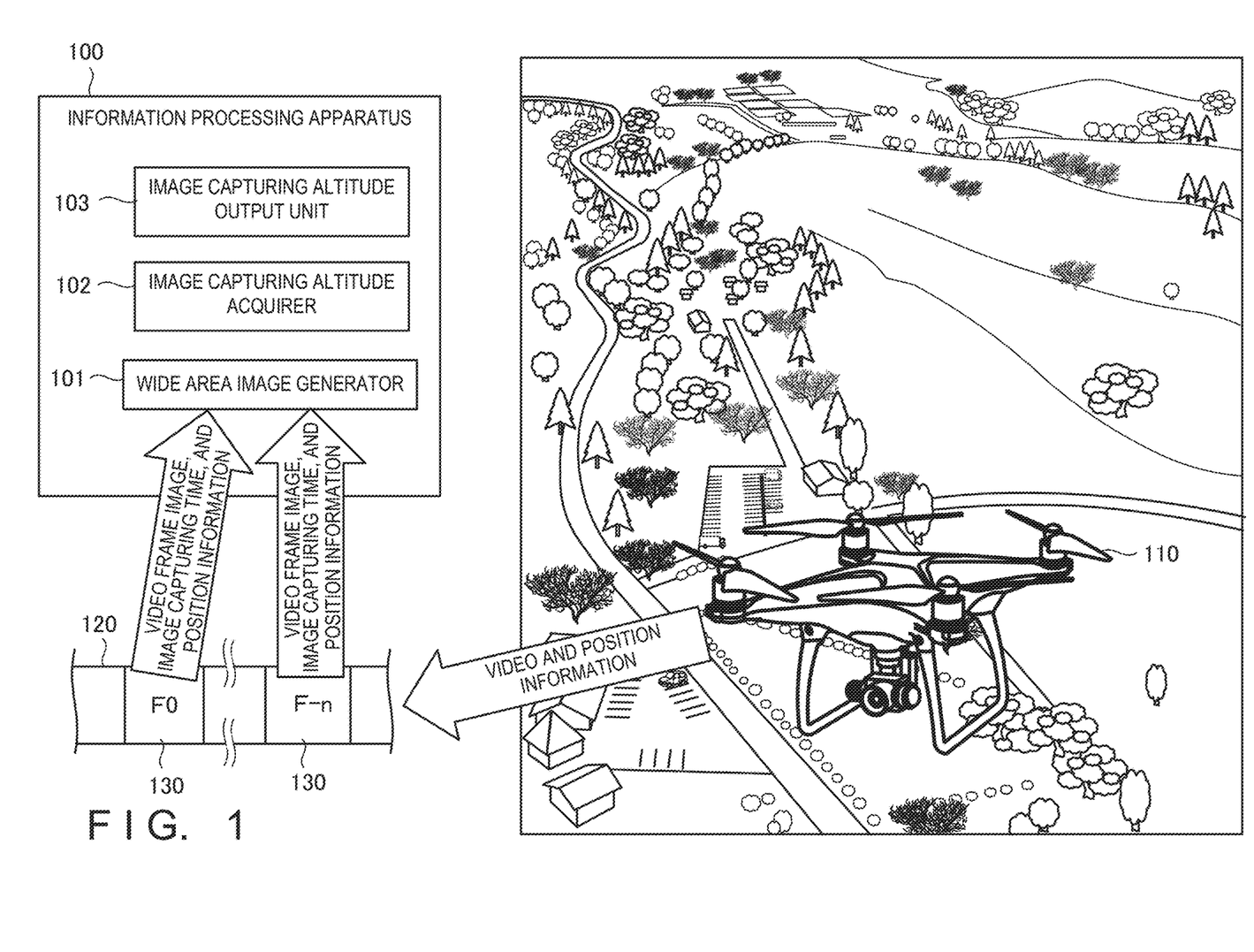
FIG. 1 is a block diagram showing the arrangement of an information processing apparatus according to the first example embodiment of the present invention.

As shown in FIG. 1, the information processing apparatus 100 includes a wide area image generator 101, an image capturing altitude acquirer 102, and an output unit 103.

The wide area image generator 101 extracts, from a flying body video 120 obtained when a flying body 110 captures a ground area spreading below while moving, a plurality of video frame images 130 and combines them, thereby generating a captured image in a wide area.

The image capturing altitude acquirer 102 acquires a flight altitude at the point of time of image capturing by the flying body 110 for each of the plurality of video frame images 130.

The image capturing altitude output unit 103 outputs the flight altitude for each video frame image 130.

According to the above-described arrangement, concerning a partial area image that constitutes a wide area image, it is possible to control the flying body in accordance with the flight altitude at the past point of time of image capturing.

Second Example Embodiment

Figure 2:
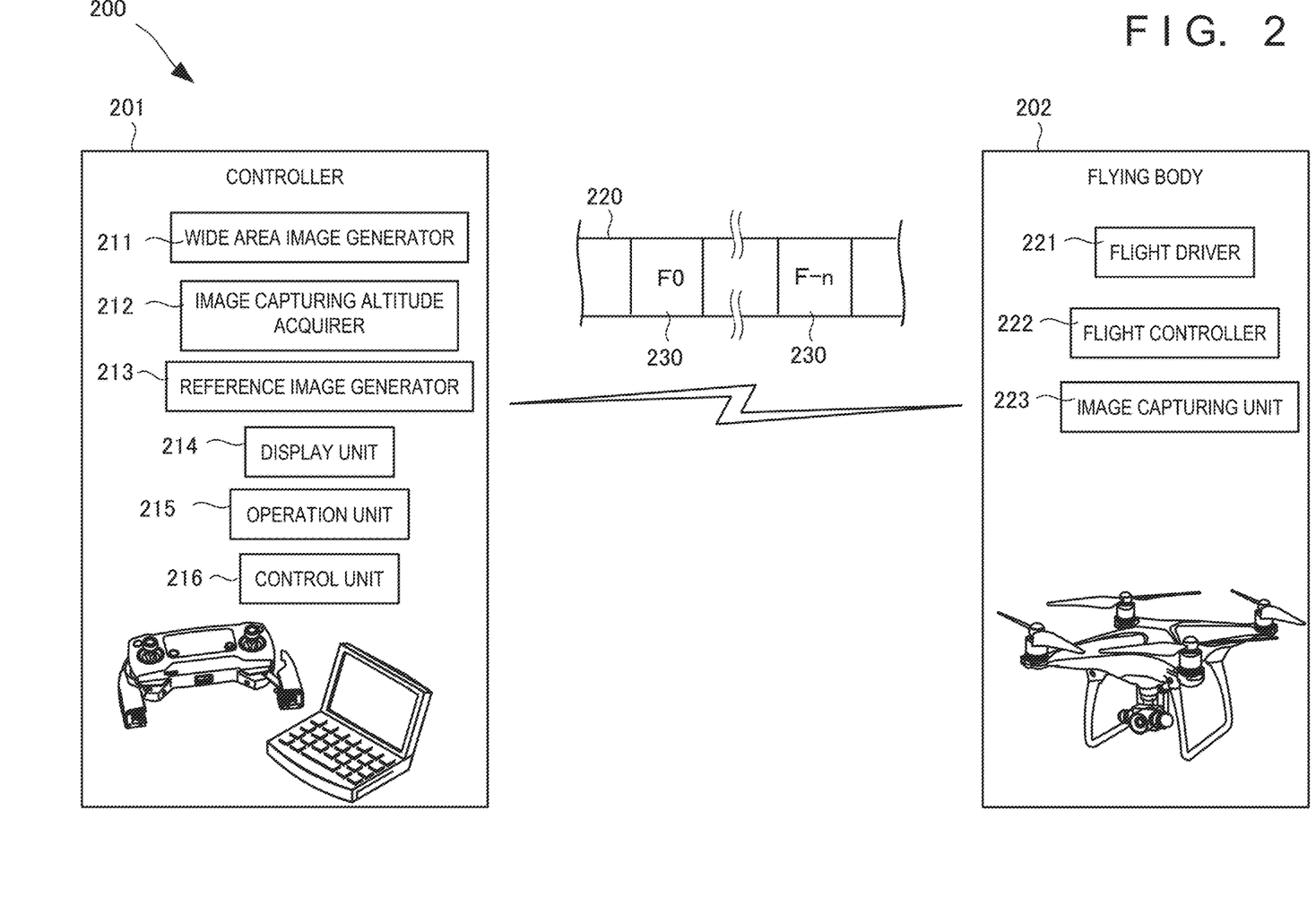
FIG. 2 is a block diagram showing the arrangement of an information processing apparatus according to the second example embodiment of the present invention.

An information processing system according to the second example embodiment of the present invention will be described next with reference to FIG. 2 and subsequent views. FIG. 2 is a view for explaining an information processing system including a controller 201 saving as an information processing apparatus according to this example embodiment and a flying body 202.

The controller 201 is a device having a calculation capability such as a so-called transmitter for radio-controlled toys or a notebook PC, and includes a wide area image generator 211, an image capturing altitude acquirer 212, a reference image generator 213, a display unit 214, an operation unit 215, and a control unit 216. The flying body 202 includes a flight driver 221 including a propeller and a motor, a flight controller 222 that controls the flight driver 221, and an image capturing unit 223 that captures a video.

The wide area image generator 211 extracts, from a flying body video 220 obtained when the flying body 202 captures a ground area spreading below while moving, a plurality of video frame images 230 and combines them, thereby generating a captured image in a wide area. When combining the plurality of video frame images 230, selection, position adjustment, and the like of the images 230 are performed using the latitude/longitude, azimuth, and image feature at the time of image capturing.

Figure 3:
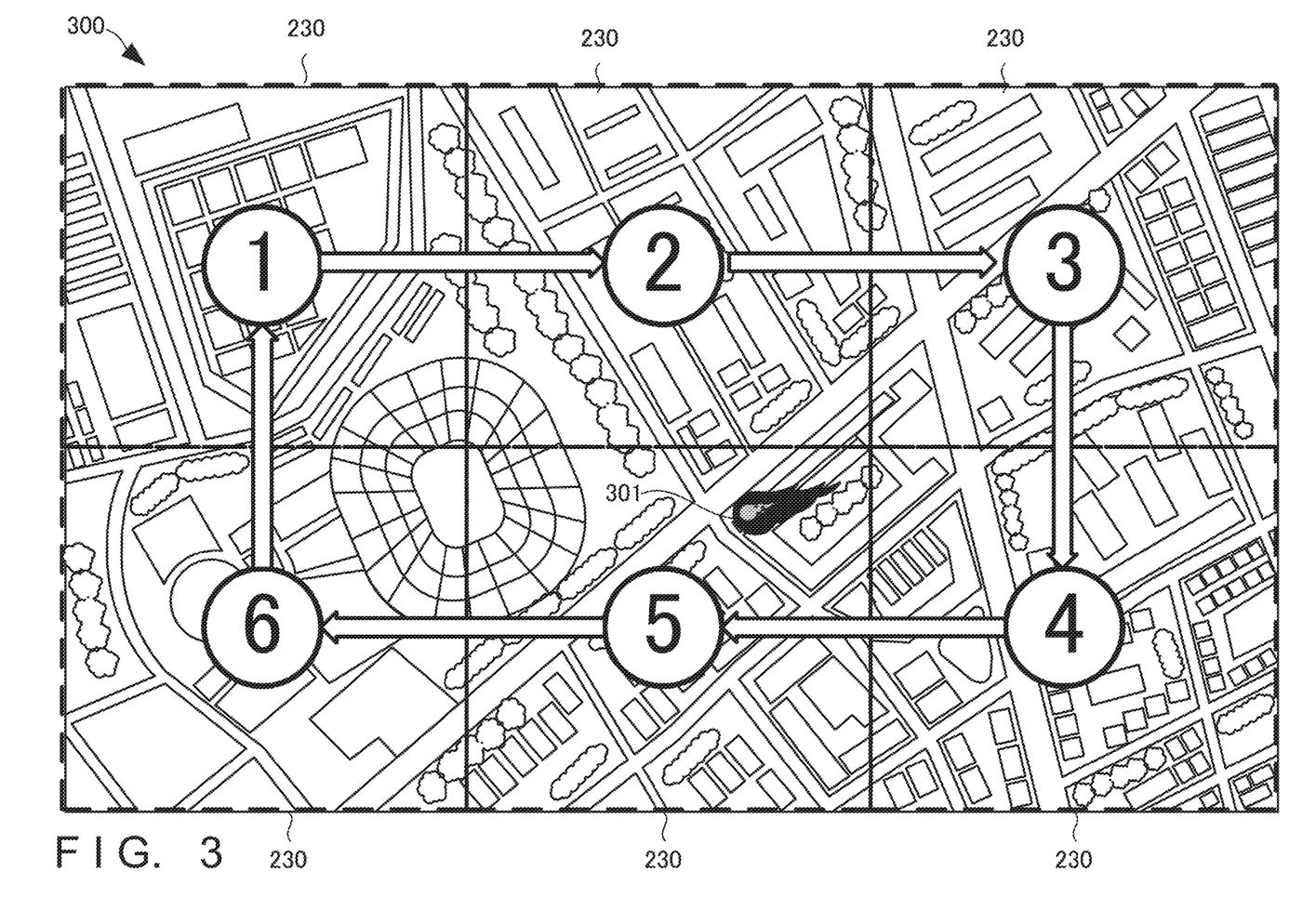
FIG. 3 is a view showing a display image of the information processing apparatus according to the second example embodiment of the present invention.

For example, a wide area image 300 generated in this way is shown in FIG. 3. The partial images 230 obtained when the flying body 202 captures positions indicated by (1) to (6) while moving are combined, thereby generating the wide area image 300.

Figure 4:
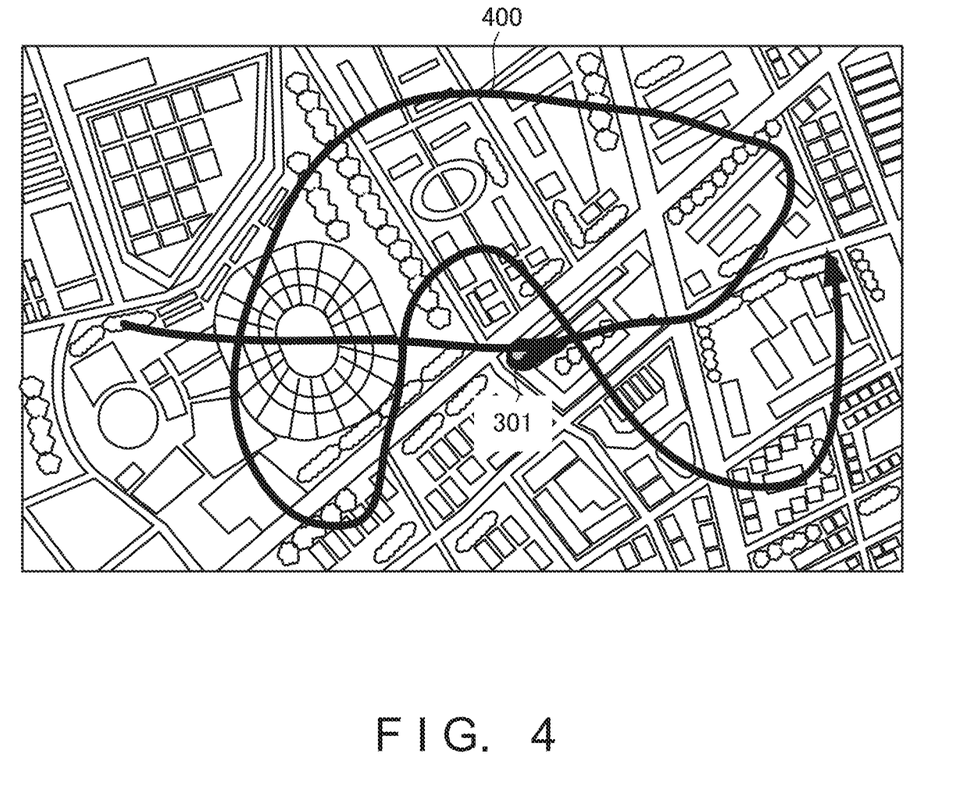
FIG. 4 is a view for explaining the display image of the information processing apparatus according to the second example embodiment of the present invention.
Figure 5:
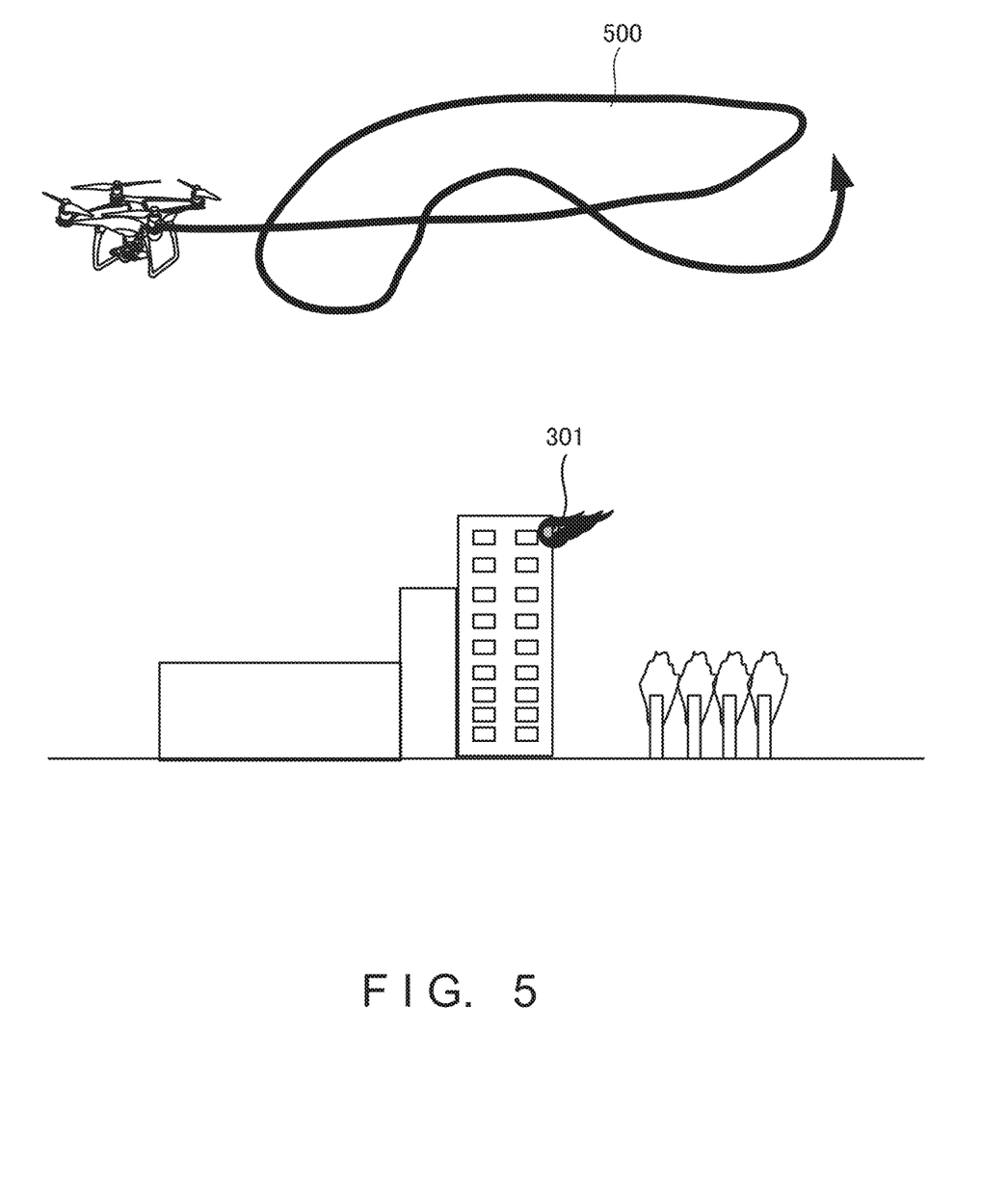
FIG. 5 is a view for explaining the display image of the information processing apparatus according to the second example embodiment of the present invention.

The image capturing altitude acquirer 212 acquires, for each video frame image 230, an image capturing altitude, that is, the altitude information of the flying body 202 at the time of image capturing. A case in which the wide area image is generated by horizontally moving to the organized positions (1) to (6) has been described with reference to FIG. 3. When capturing an area on the periphery of a place where a fire 301 has broken out, it is not necessarily best to horizontally fly. As indicated by an arrow 400 in FIG. 4, the flying body may fly on the periphery of the fire 301 at random. As indicated by an arrow 500 in FIG. 5, the flying body may fly on the periphery of the fire 301 while changing the altitude. When image capturing is performed while changing the altitude in that way, the resolution of the image (the number of pixels per unit area of ground) changes in accordance with the flight altitude at the point of time of image capturing.

To notify the user of the change in the resolution, the reference image generator 213 combines the flight altitude for each video frame image and the position information of the flying body 202 at the time of capturing of the video frame image, thereby generating a gradation image serving as a reference image. More specifically, a flight altitude image, that is, a gradation image representing the difference of the flight altitude (resolution) as the difference of the color or a change in the depth of the color is generated for each partial area included in the wide area image.

Figure 6:
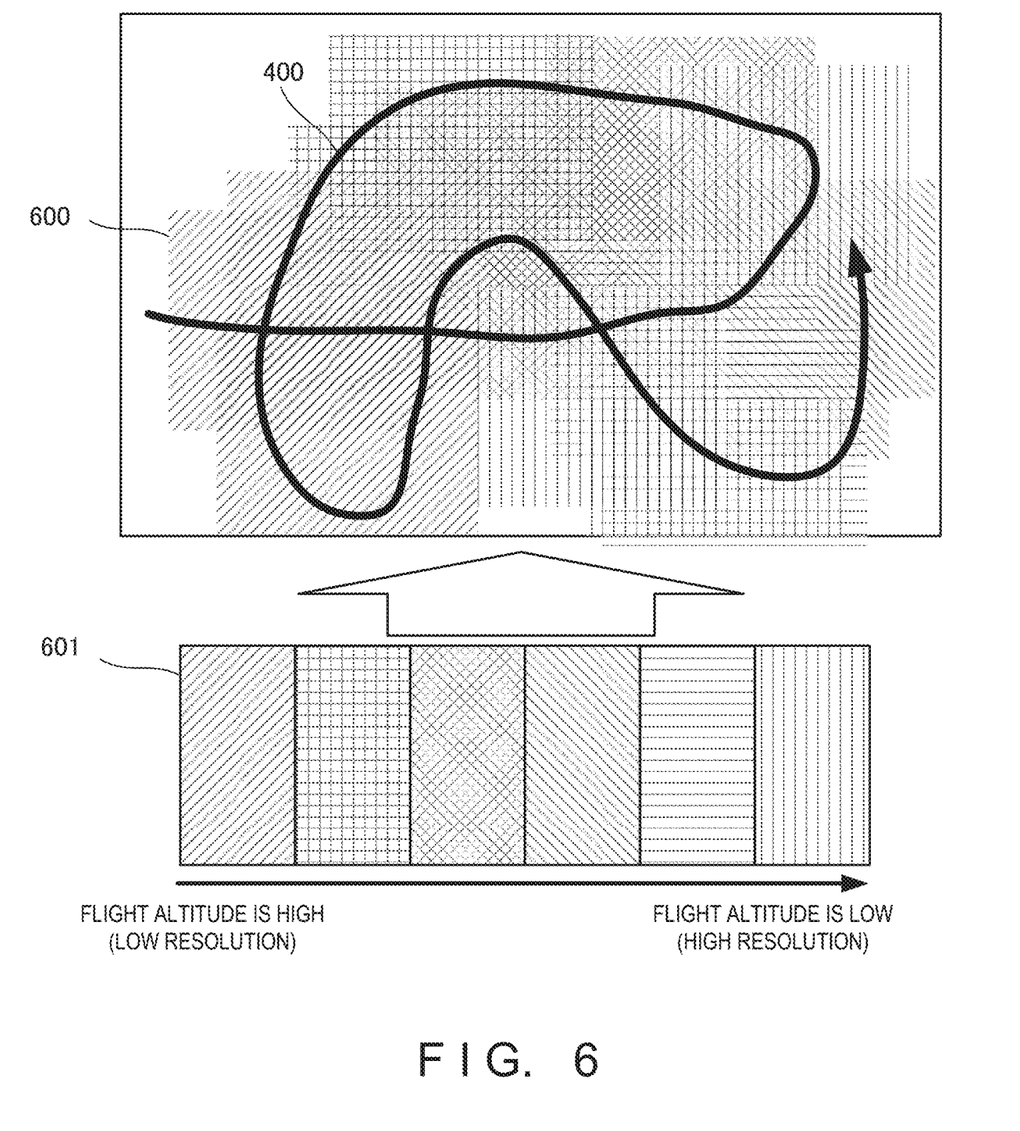
FIG. 6 is a view for explaining the display image of the information processing apparatus according to the second example embodiment of the present invention.

FIG. 6 is a view showing a gradation image 600 as one example. As indicated by an image 601, the depth of the color is changed sequentially from a partial image of a high image capturing altitude (low resolution) to a partial image of a low image capturing altitude (high resolution), thereby generating the gradation image 600.

The display unit 214 may display the gradation image 600 superimposed on the wide area image 300, may display them in parallel, or may selectively display one of them.

The operation unit 215 accepts an operation by the user, and sends a control instruction to the flight controller 222 of the flying body 202. The user can determine the position to move the flying body 202 next and operate the flying body 202 while viewing the gradation image serving as the reference image.

In addition, the control unit 216 accepts the image capturing altitude for each video frame image from the image capturing altitude acquirer 212, decides the moving route of the flying body 202 in accordance with the image capturing altitude for each video frame image, and transmits it to the flight controller 222. That is, the control unit 216 specifies the video frame image (that is, a lowest resolution partial image) for which the flight altitude at the past point of time of image capturing is highest, and preferentially moves the flying body 202 to a lower altitude at the position at which the low resolution partial image was captured.

Figure 7:
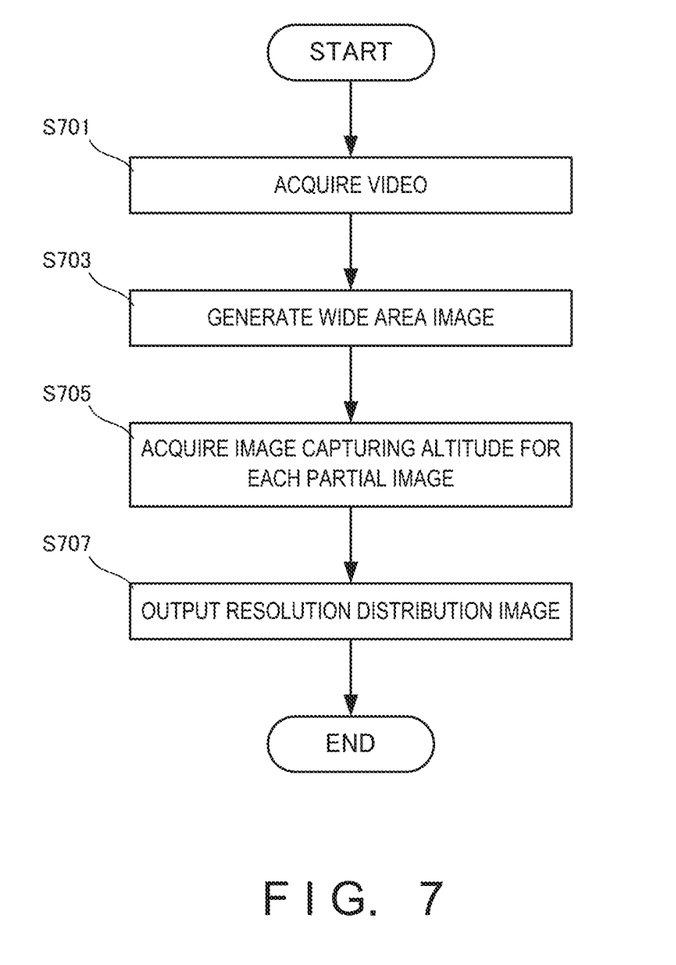
FIG. 7 is a flowchart showing the procedure of processing of the information processing apparatus according to the second example embodiment of the present invention.

FIG. 7 is a flowchart showing the procedure of processing of the controller 201. First, in step S701, captured video data is acquired from the flying body 202. Next, in step S703, a plurality of video frame images are extracted from the video data, and the plurality of video frame images are combined to generate a wide area image.

Furthermore, in step S705, the image capturing altitude for each partial image included in the wide area image is acquired. Then, in step S707, a gradation image of the image capturing altitude, that is, the resolution distribution is generated using the image capturing altitude for each partial image and a flying body position at which the partial image was captured. Alternatively, at this time, as the next destination, the flying body is made to fly to a position at which a partial image of a low resolution was captured to perform image capturing at a lower altitude.

According to the above-described arrangement, concerning a partial area image that constitutes a wide area image, it is possible to control the flying body in accordance with the flight altitude at the past point of time of image capturing.

Third Example Embodiment

Figure 8:
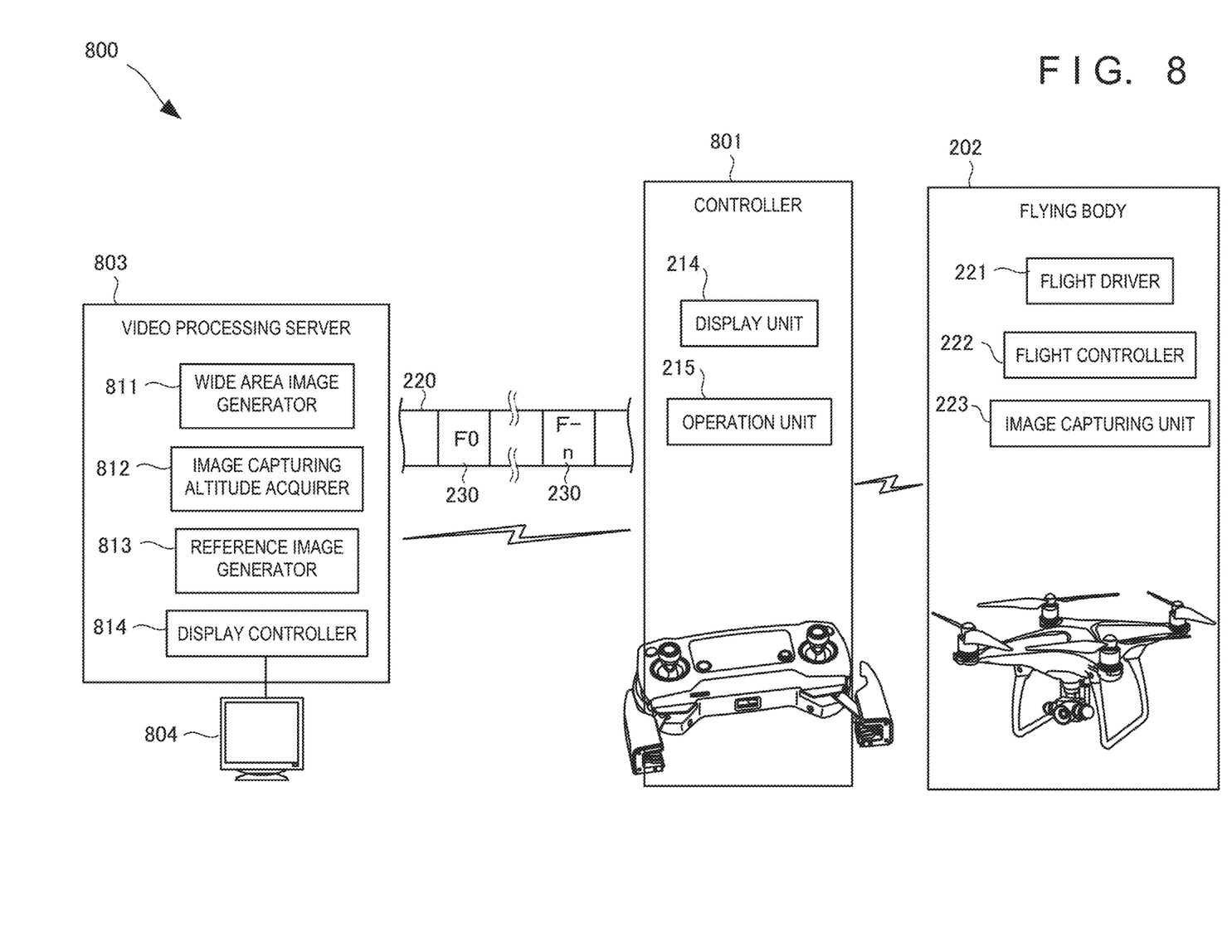
FIG. 8 is a block diagram showing the arrangement of an information processing apparatus according to the third example embodiment of the present invention.

An information processing system 800 according to the third example embodiment of the present invention will be described next with reference to FIG. 8. FIG. 8 is a functional block diagram for explaining the schematic arrangement of the information processing system 800 according to this example embodiment. The information processing system 800 according to this example embodiment includes a video processing server 803 and a display 804, and a controller 801 does not include a wide area image generator 211, and the like, unlike the second example embodiment. The rest of the components and operations is the same as in the second example embodiment. Hence, the same reference numerals denote the same components and operations, and a detailed description thereof will be omitted.

A wide area image generator 811 of the video processing server 803 acquires a flying body video 220 via the controller 801, extracts a plurality of video frame images 230 from the flying body video 220, and combines the video frame images 230, thereby generating a captured image in a wide range. When combining the plurality of video frame images 230, selection, position adjustment, and the like of the video frame images 230 are performed using the latitude/longitude, azimuth, and image feature at the time of image capturing.

An image capturing altitude acquirer 812 acquires, for each video frame image 230, an image capturing altitude, that is, the altitude information of the flying body 202 at the time of image capturing. To notify the user of the resolution (the number of pixels per unit area of ground) of the image, which changes depending on the flight altitude at the point of time of image capturing, a reference image generator 813 combines the flight altitude for each video frame image and the position information of the flying body 202 at the time of capturing of the video frame image, thereby generating a gradation image serving as a reference image. More specifically, a gradation image serving as a reference image representing the difference of the flight altitude (resolution) as the difference of the color or a change in the depth of the color is generated for each partial area included in the wide area image.

A display controller 814 outputs the generated gradation image to the display 804. The display 804 may display the gradation image superimposed on the wide area image, may display them in parallel, or may selectively display one of them.

According to the above-described arrangement, concerning a partial area image that constitutes a wide area image, it is possible to control the flying body in accordance with the flight altitude at the past point of time of image capturing.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

The invention claimed is:

1. An information processing apparatus comprising:
a wide area image generator that extracts, from a video obtained when a flying body captures a ground area spreading below while moving by changing a flight altitude of the flying body, a plurality of video frame images and joins the plurality of extracted video frame images, thereby generating a joined image of the ground area in a wide area;
an image capturing altitude acquirer that acquires the flight altitude of the flying body at a point of time of image capturing by the flying body for each of the plurality of extracted video frame images; and
a display unit that displays, together with the joined image of the ground area, a flight altitude image representing flight altitudes each of which is acquired by the image capturing altitude acquirer at the point of time of image capturing by the flying body for each of the plurality of extracted video frame images.

2. The information processing apparatus according to claim 1, wherein the flight altitude image is an image in which a difference of the flight altitude of the flying body for each of the plurality of extracted video frame images is represented by a different color.

3. The information processing apparatus according to claim 1, wherein the flight altitude image is an image in which a difference of the flight altitude of the flying body for each of the plurality of extracted video images is represented by a change in a depth of a color.

4. The information processing apparatus according claim 1, further comprising a controller that controls the flying body, wherein the display unit transfers the flight altitude for each of the plurality of extracted video frame images to the controller, and the controller decides a moving route of the flying body in accordance with the flight altitude of the flying body for each of the plurality of extracted video frame images.

5. The information processing apparatus according to claim 4, wherein the controller specifies the video frame image when the flight altitude of the flying body is highest among flight altitudes of the flying body at past points of times of image capturing, and moves the flying body to a flight altitude lower than the flight altitude of the flying body at a position at which the specified video frame image was captured.

6. An information processing apparatus comprising:
a wide area image generator that extracts, from a flying body video obtained when a flying body captures a ground area spreading below while moving by changing a flight altitude of the flying body, a plurality of video frame images and joins the plurality of extracted video frame images, thereby generating a joined image of the ground area in a wide area;
an image capturing altitude acquirer that acquires the flight altitude of the flying body at a point of time of image capturing by the flying body for each of the plurality of extracted video frame images; and
a display unit that displays, superimposed on the joined image of the ground area, a flight altitude image representing flight altitudes, each of which is acquired at the point of time of image capturing by the flying body for each of the plurality of extracted video frame images.

7. An information processing apparatus comprising:

a wide area image generator that extracts, from a flying body video obtained when a flying body captures a ground area spreading below while moving by changing a flight altitude of the flying body, a plurality of video frame images and joins the plurality of extracted video frame images, thereby generating a joined image of the ground area in a wide area;

an image capturing altitude acquirer that acquires the flight altitude of the flying body at a point of time of image capturing by the flying body for each of the plurality extracted of video frame images; and a display unit that displays the joined image of the ground area with a resolution image that expresses image resolutions in place of flight altitudes, each of which is acquired at the point of time of image capturing by the flying body for each of the plurality of extracted video frame images.

\* \* \* \* \*